US012360136B2

(12) United States Patent
Coe et al.

(10) Patent No.: US 12,360,136 B2
(45) Date of Patent: Jul. 15, 2025

(54) DAMPING BASE FOR MODULAR SCANNING PROBE MICROSCOPE HEAD

(71) Applicant: Rutgers, The State University of New Jersey, New Brunswick, NJ (US)

(72) Inventors: Angela M. Coe, Tenstrike, MN (US); Guohong Li, Highland Park, NJ (US); Eva Y. Andrei, Highland Park, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 386 days.

(21) Appl. No.: 17/996,246

(22) PCT Filed: May 6, 2021

(86) PCT No.: PCT/US2021/031120
§ 371 (c)(1),
(2) Date: Oct. 14, 2022

(87) PCT Pub. No.: WO2021/226354
PCT Pub. Date: Nov. 11, 2021

(65) Prior Publication Data
US 2023/0176088 A1 Jun. 8, 2023

Related U.S. Application Data

(60) Provisional application No. 63/021,713, filed on May 8, 2020.

(51) Int. Cl.
*G01Q 30/16* (2010.01)
*G01Q 30/10* (2010.01)
(Continued)

(52) U.S. Cl.
CPC ............. *G01Q 30/16* (2013.01); *G01Q 30/10* (2013.01); *G01Q 30/18* (2013.01); *G01Q 60/16* (2013.01)

(58) Field of Classification Search
CPC ........ G01Q 30/16; G01Q 30/10; G01Q 30/18; G01Q 60/16
See application file for complete search history.

(56) References Cited

U.S. PATENT DOCUMENTS 5,410,910 A   5/1995  Somlyo et al.
7,414,250 B1  8/2008  Hersam et al.
(Continued)

OTHER PUBLICATIONS

International Preliminary Report on Patentability received for PCT Patent Application No. PCT/US21/31120, mailed on Nov. 17, 2022, 8 pages.
(Continued)

Primary Examiner — Nicole M Ippolito
(74) Attorney, Agent, or Firm — Wolter Van Dyke Davis, PLLC; Eugene J. Molinelli; Patrick Herron

(57) ABSTRACT

An apparatus, including a scanning probe microscope base that includes a configured to be secured to an end of an insert in a cryostat; a top configured to be connected to a base of a scanning probe microscope head that is configured to be disposed inside the insert; and a damping system disposed between the frame and the top and comprising a bellows that seals the end of the insert. This sealing separates an ultra-high vacuum (UHV) environment in the insert from a high vacuum (HV) environment surrounding the end of the insert and also positions an upper surface of the top in the UHV environment.

27 Claims, 14 Drawing Sheets

(51) Int. Cl.
*G01Q 30/18* (2010.01)
*G01Q 60/16* (2010.01)

(56) References Cited

U.S. PATENT DOCUMENTS

| | | |
|---|---|---|
| 2004/0035243 A1 | 2/2004 | Duval |
| 2012/0319003 A1 | 12/2012 | Shichi et al. |
| 2014/0326707 A1 | 11/2014 | Schmitz et al. |
| 2019/0025339 A1* | 1/2019 | Wu ........................ G01Q 30/16 |

OTHER PUBLICATIONS

International Search Report and Written Opinion received for PCT Patent Application No. PCT/US21/31120, mailed on Aug. 31, 2021, 8 pages.

* cited by examiner

FIG. 13A

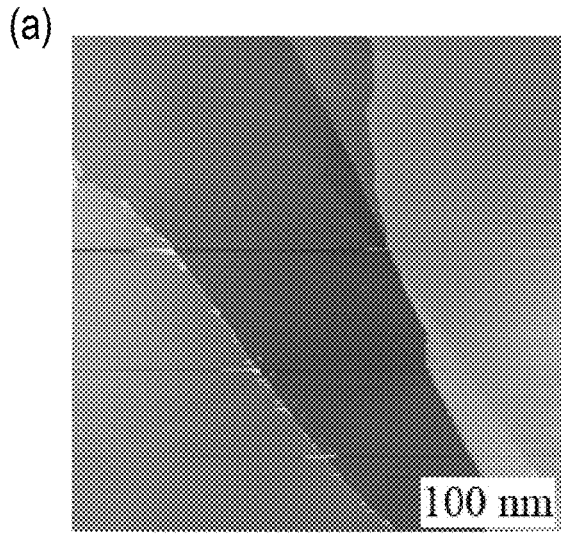

FIG. 13B

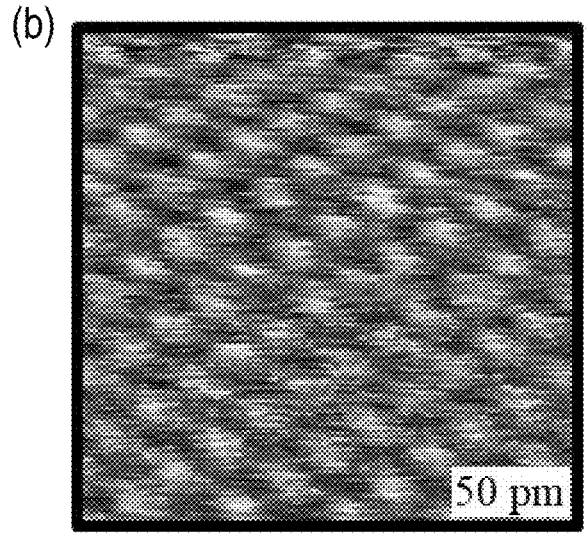

STM on table scanning highly oriented pyrolytic graphite (HOPG). Raw data. Bias voltage of 300mV and current set point of 200pA. Fig. 13A is a large area scan of HOPG showing terraces. Fig. 13B is an atomic resolution scan of HOPG.

FIG. 14A

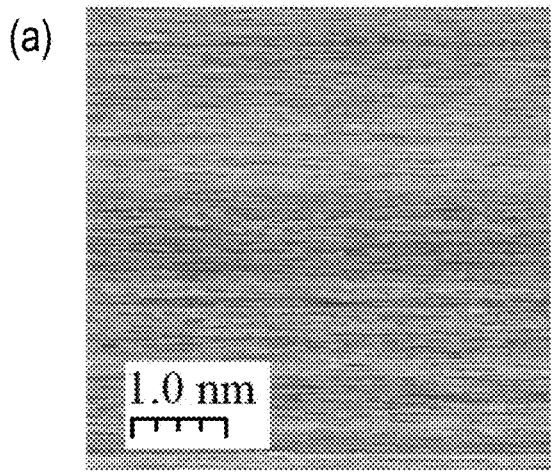

FIG. 14B

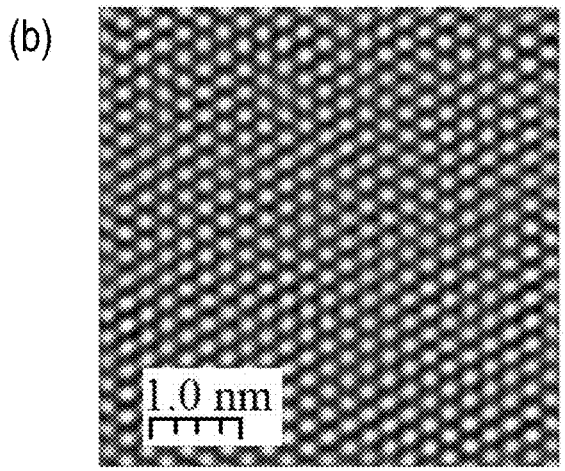

Figure 14A is a topography image with the vibration control system not utilized. This makes the vibration level too high and prevents the observation of carbon atoms. Figure 14B is a topography image taken while the vibration control system is active. The vibration control system has reduced the vibrations reaching the STM and allows observation of carbon atoms.

DAMPING BASE FOR MODULAR SCANNING PROBE MICROSCOPE HEAD

CROSS-REFERENCE TO RELATED APPLICATION

This application claims priority to PCT Application No. PCT/US21/31120, filed May 6, 2021, which claims the benefit of U.S. Provisional Patent Application No. 63/021,713, filed on May 8, 2020, which is incorporated by reference herein in its entirety.

STATEMENT OF GOVERNMENTAL INTEREST

This invention was made with government support under Contract No. 1337871 and Contract No. 1842213 awarded by the National Science Foundation. The government has certain rights in the invention.

BACKGROUND

Scanning probe microscope (SPM) systems which include a SPM head and a SPM base require a low temperature and (high) vacuum environment to operate successfully. To fulfil this need, SPM systems are often operated in a cryostat. In one type of cryostat a cryogen such as liquid helium is used. However, the price of helium is continually increasing. This is causing scientists and corporation researchers to turn away from liquid helium cryostats. In some instance, they are instead purchasing cryogen-free cryostats to meet their low temperature needs. Unfortunately, a major issue with cryogen-free cryostats is that pulse tubes used therein create strong mechanical vibrations which interfere with results. A low noise level is particularly critical for the operation of a scanning tunneling microscope (STM) system, which is a type of SPM where the SPM head is an STM head. Commercially available cryogen-free cryostats have been designed to minimize the vibrations, allowing for the operation of other types of scanning probe microscopes, including atomic force microscopes (AFM) and magnetic field microscopes (MFM). However, there is room in the art for improvement.

SUMMARY

In a first set of embodiments, an apparatus includes: a scanning probe microscope base including: a frame configured to be secured to an end of an insert in a cryostat; a top configured to be connected to a base of a scanning probe microscope head that is configured to be disposed inside the insert; and a damping system disposed between the frame and the top.

In a second set of embodiments, an apparatus includes: a scanning probe microscope base includes a frame configured to be secured to an end of an insert in a cryostat; a top configured to be connected to a base of a scanning probe microscope head that is configured to be disposed inside the insert; and a damping system disposed between the frame and the top and including a bellows that seals the end of the insert. This sealing separates an ultra-high vacuum (UHV) environment in the insert from a high vacuum (HV) environment surrounding the end of the insert and also positions an upper surface of the top in the UHV environment.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIGS. 13A and 13B show example scans made using the scanning probe microscope on a tabletop without the vibration isolation provided by the SPM base; and FIGS. 14A and 14B show example scans made using the scanning probe microscope in the cryostat and with the vibration isolation provided by the SPM base.

DETAILED DESCRIPTION

Figure 1:
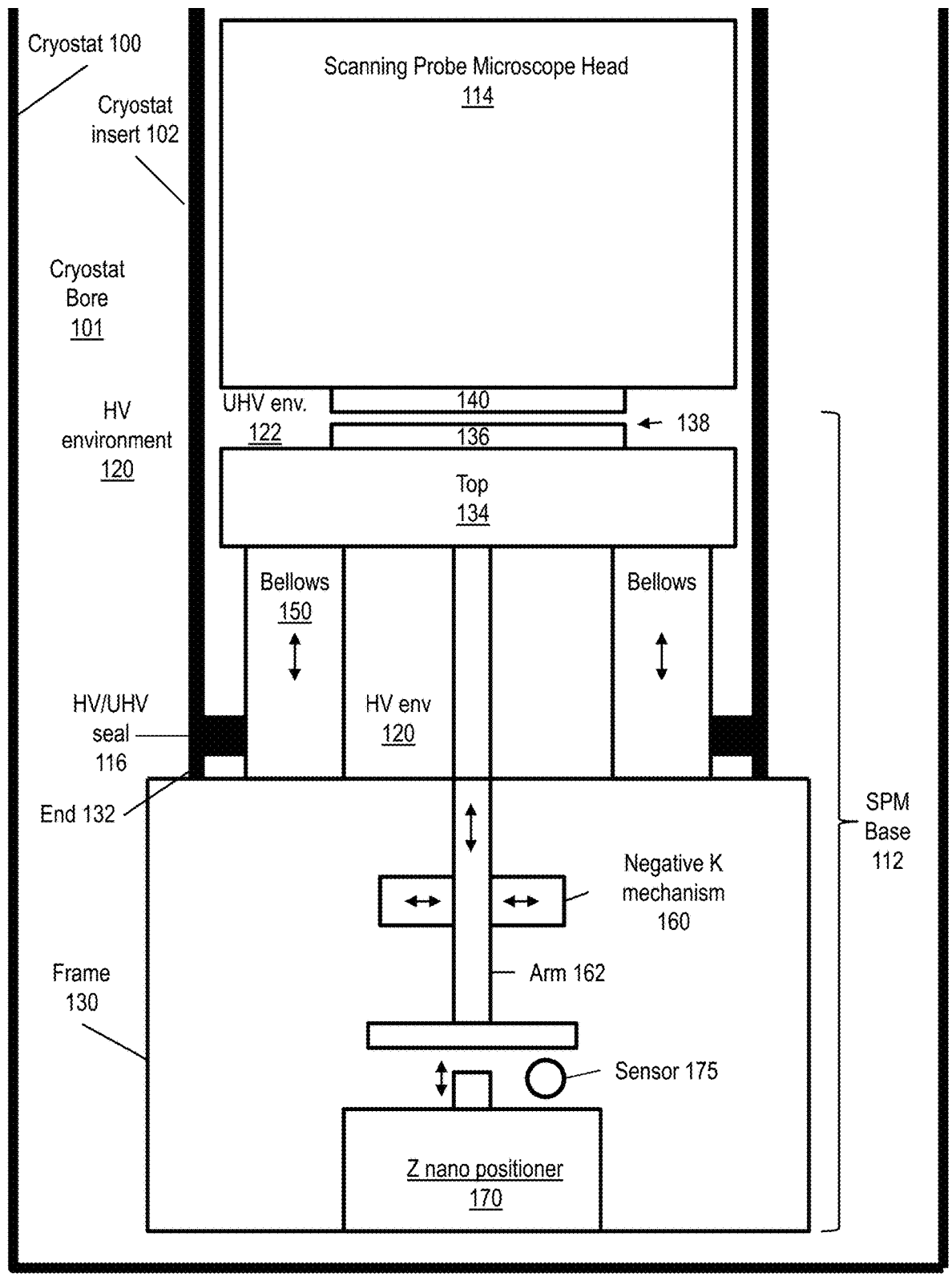
FIG. 1 is a block diagram that illustrates an example embodiment of the SPM base supporting an SPM head that is installed in a cryostat insert of a cryostat.

A method and apparatus are described for a damping scanning probe microscope base (SPM base) to support a modular scanning probe microscope head (SPM head) of a scanning probe microscope system (SPM system). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of use with a scanning tunneling microscope used in a cryogen-free cryostat. However, the invention is not limited to this context. In other embodiments, the invention can be used with any sort of scanning probe microscope or even other suitable tools that require a vibration damping base. Likewise, the base can be used in any sort of cryostat or any suitable environment, with or without a change in vacuum level between the top and bottom of the base.

1. Overview

The inventors have created an SPM system having a modular SPM base and a modular SPM head disposed thereon. The SPM base is able to connect to the end of a cryostat insert of existing cryogen-free cryostats. The SPM base is disposed between the end of the cryostat insert and the SPM head, thereby isolating the SPM head from vibrational noise present in the end of the cryostat insert. The SPM base is an internal vibration isolation base that dampens vibrational noise present in the end of the cryostat insert so that the vibrational noise level reaching the SPM head is low enough to operate the SPM head. In particular, the vibrational noise is reduced enough to operate scanning tunnel microscope systems (STM system), a type of SPM system that is particularly susceptible to vibrational noise. Consequently, the SPM system disclosed herein can be any type of SPM system, including an STM system in which the SPM head is an STM head. The invention uses either or both passive and active damping to reduce the vibrational noise reaching the SPM head. In addition, the SPM base can work in a vacuum environment and non-vacuum environments as well as low temperature and non-low temperature environments.

As can be seen in FIG. 1, a cryostat 100 includes bore 101 into which is inserted a cryostat insert 102. The scanning probe microscope SPM head 114 (which may be an STM head in any embodiment discussed) is supported by an SPM base 112. An HV/UHV seal 116 separates a high vacuum (HV) environment 120 in the cryostat 100 from an ultra-high vacuum (UHV) environment 122 inside the cryostat insert 102. It is the UHV environment 122 in which the SPM head 114 operates. It is the HV environment 120 in which the remaining equipment and connections are made. In an example embodiment, a range for the HV environment 120 is $1 \times 10^{-3}$ torr to $1 \times 10^{-8}$ torr. In an example embodiment, a range for the UHV environment 122 is $1 \times 10^{-8}$ torr to $1 \times 10^{-12}$ torr When not in an HV environment 120, the HV/UHV seal 116 is optional.

In an example embodiment, the SPM base 112 includes a frame 130 secured to the end 132 of the cryostat insert 102; a top 134 configured to be connected to the SPM head 114, either as an integrated unit or using electrical connections. In the latter case, half 136 of a universal electrical connection 138 connects to a second half 140 of a universal electrical connection 138 that is disposed on the SPM head 114. In some embodiments, the universal electrical connection 138 is configured such that a weight of the SPM head 114 alone is sufficient to engage the universal electrical connection 138. In an example embodiment, in addition to the weight, an additional engagement force is applied to complete the engagement. The additional engagement force may be applied via a mechanism used to deliver the SPM head 114 to the SPM base 112 in the cryostat insert 102. For example, a stiffness of a cable on which the SPM head 114 is suspended may be used to exert the additional engagement force necessary to engage the universal electrical connection 138. In an example embodiment, the total engagement force necessary to engage the universal electrical connection 138 is up to 350 grams. In an example embodiment, the total engagement force is 300 grams.

The SPM base 112 further includes a vibration control system between the frame 130 and the top 134. In the embodiment shown, a bellows 150 acts as a passive low-pass vibration filter system of the vibration control system and is disposed between the frame 130 and the top 134. Consequently, the bellows mitigates high-frequency vibrations which reach the top 134 and to which the SPM head 114 disposed thereon is susceptible. By virtue of the inverted pendulum design, the bellows 150 mitigates vibrations in the X direction, the Y direction, and the Z direction. The bellows 150 is made of any materials and any dimensions that provides adequate passive low pass performance. For example, the bellows 150 can be made of the following materials: stainless steel, beryllium copper, and phosphorus bronze. In an example embodiment, to fit inside the cryostat insert 102 the bellows 150 should have a diameter in a range from 1.5-4 centimeters and a height in a rage of 1.5-2.75 centimeters. The performance is characterized by a resonant frequency of the bellows 150 and the top 134. In an example embodiment, when the SPM base 112 loaded with a weight of about 100-200 grams, the resonant frequency may be about 5-20 Hz. In the example embodiment, this provides damping by a least 10-30 dB for frequencies above 15-60 Hz.

The HV/UHV seal 116 is disposed between the end 132 of the cryostat insert 102 and a bottom of the bellows 150. Because the HV/UHV seal 116 can be a path for vibration transmission, placing it at the bottom of the bellows 150 is advantageous as it enables the bellows 150 to filter vibrations transmitted by the HV/UHV seal 116. In this embodiment, the bellows 150 is also sealed at its top. This completes a seal between the HV environment 120 in the cryostat 100 and the UHV environment 122 in the cryostat insert 102.

The effective resonant frequency of the bellows 150 and the top 134 can be further lowered by introducing a negative k mechanism 160 as part of the vibration control system. The negative k mechanism 160 and the bellows 150 work together to reduce the effective resonant frequency. The negative k mechanism 160 can be any negative k mechanism known to the artisan. The negative k mechanism 160 shown acts on an arm 162 that is connected to the top 134. In an example embodiment, when the negative k mechanism 160 is properly tuned, the resonant frequency of the system (now including the bellows 150, the top 134, and the negative K mechanism 160) can be as low as about 0.5-2 Hz with the same load of about 100-200 grams. In the example embodiment, this results in about 10-30 dB vibration reduction for frequencies above about 1.5-6 Hz.

In an example embodiment, the vibration control system includes a Z positioner 170 (a.k.a. Z nano positioner) that can further dampen the vibrations near the resonant frequency and can acts as either or both of a passive mode and an active mode. Any suitable type of piezo Z positioner known to the artisan may be used as long as the Z positioner can fit inside the space and in an example embodiment, allow for a range of motion of 1.5-10 millimeters. An example of a commercial Z positioner is the ANPz51 from Attocube Systems Inc. of Haar, Germany. It has a range of motion up to 2.5 millimeters, which is satisfactory in the embodiment described. When in the passive mode, the Z positioner 170 can be raised within reach of the inverted pendulum arm 162 to act as a stopper. In this operation, the Z positioner 170 sets an upper limit to the amplitude of resonant vibrations and provides proximity damping. When in the active mode, the Z positioner 170 can be raised to engage with the inverted pendulum arm 162 and then the height of the Z positioner 170 can be continuously adjusted to compensate the vibrations. The height of the Z positioner 170 may be monitored using a sensor 175. In one embodiment, the sensor 175 can be a capacitance plate sensor with two electrodes. In another embodiment, the sensor 175 could be a capacitance displacement sensor. When equipped with the sensor 175, the Z-positioner 170 can be configured to compensate for actual vibrations detected by the sensor 175 in the active mode. In other example embodiments, the sensor 175 can be present but associated with components other than the Z-positioner 170. The vibration data from the sensor 175 can be used by the other components to mitigate vibrations in the arm 162 and/or in the top 134 and thereby in the SPM head 114.

Although equipment is depicted in FIG. 1 as integral blocks in a particular arrangement for purposes of illustration, in other embodiments one or more structures, or portions thereof, may be arranged in a different manner and/or may be separated out of the shown block.

2. Example Embodiments

FIG. 2 to FIG. 6 discuss the general concepts of an example embodiment of an apparatus and a scanning probe microscope system (SPM system) using schematic drawings. The remaining figures discuss an implementation of the SPM base that applies the principles shown in the schematic drawings.

Figure 2:
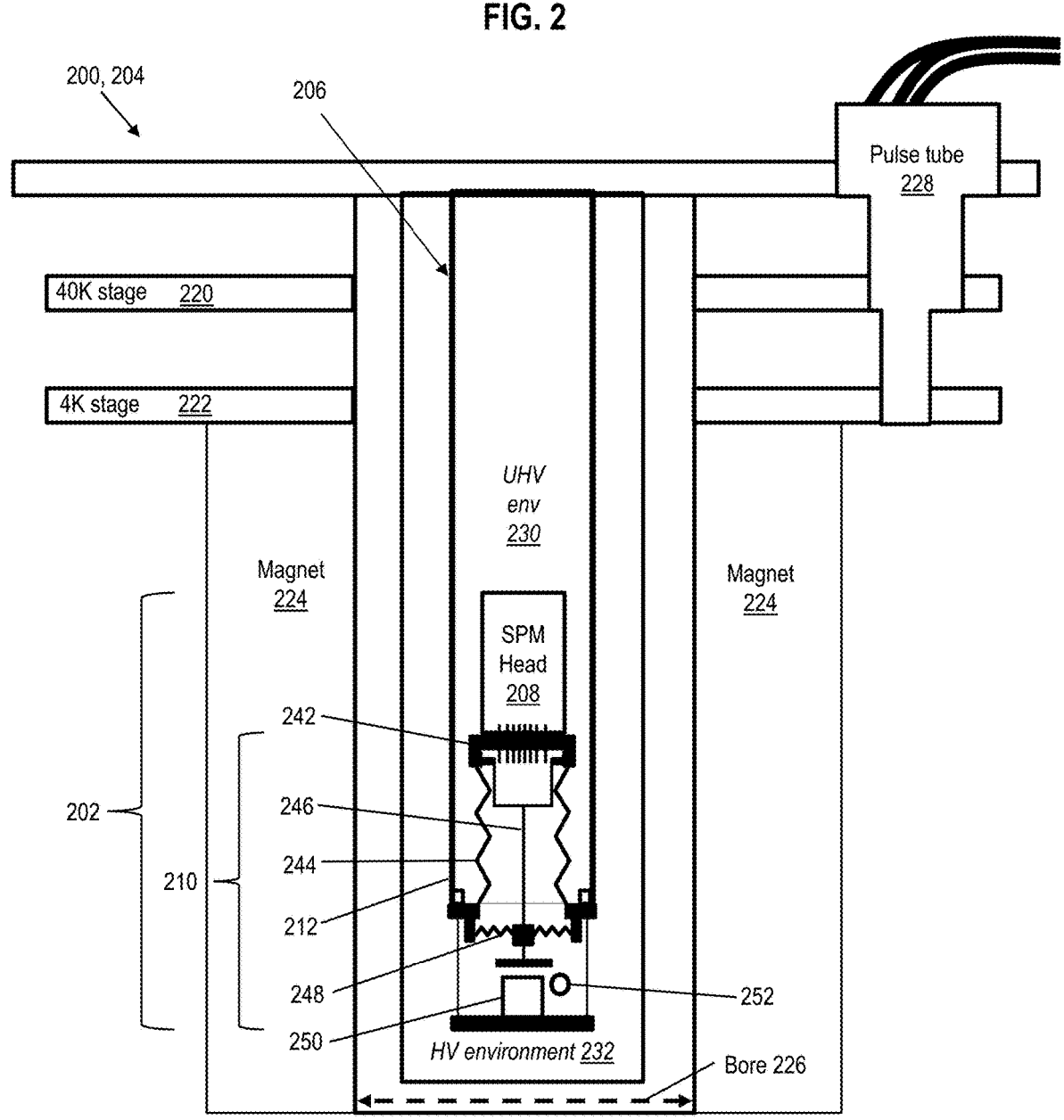
FIG. 2 schematically represents an example embodiment of an apparatus with the SPM system disposed therein.

FIG. 2 schematically represents an example embodiment of an apparatus 200 and the SPM system 202 disposed therein. The apparatus 200 includes a cryogen free cryostat 204 and a cryostat insert 206. The SPM system 202 includes an SPM head 208 and SPM base 210 that are disposed at an end 212 of the cryostat insert 206. The cryostat 204 includes a 40K stage 220, a 4k stage 222, a magnet 224, a bore 226, and a pulse tube 228. The inner region of the cryostat insert 206 contains the ultra-high vacuum (UHV) environment 230. The UHV environment 230 is the operating space for the SPM head 208 and helps to keep the SPM head 208 clean. The region outside the cryostat insert 206 is the high vacuum (HV) environment 232. The HV environment 232 is for helium gas exchange and wiring etc. The helium exchange gas is used to cool the SPM head 208 to the required low temperatures. The pulse tube 228 is used to cool the cryostat 204 but generates vibrations during the cooling process. The SPM head 208 rests atop and is secured to the end 212 of the cryostat insert 206 by the SPM base 210. The SPM base 210 includes a top 242 (a.k.a. connector), bellows 244, arm 246 (a.k.a. rigid structure), the negative k mechanism 248 (a.k.a. negative K stiffness mechanism), and the Z positioner 250 plus the associated sensor 252 (collectively a.k.a. the proximity probe).

Figure 3:
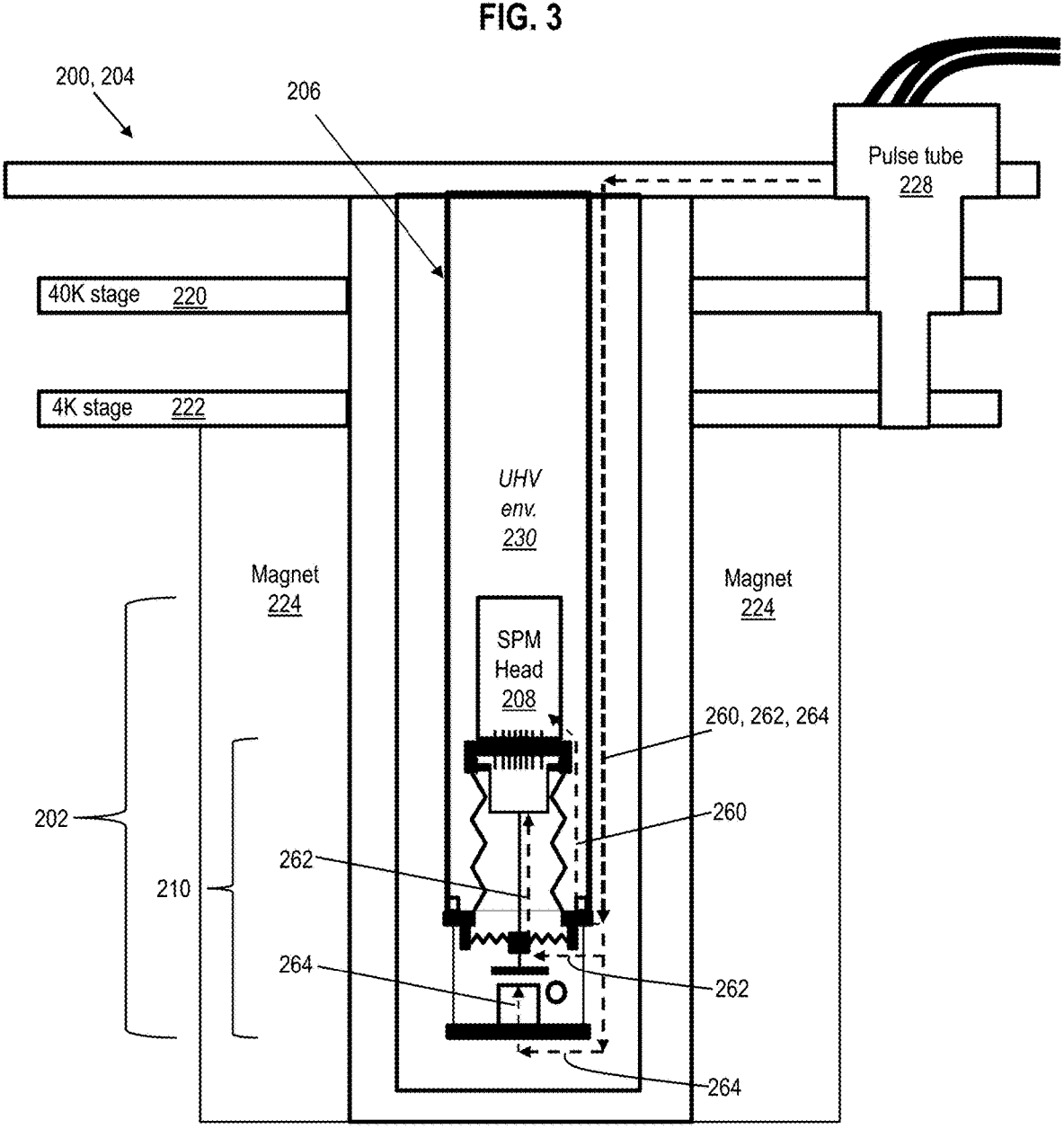
FIG. 3 shows vibration paths in the SPM system of FIG. 2.

As can be seen in FIG. 3, vibrations can a variety of paths 260, 262, 264 from the pulse tube 228 to the SPM head 208. The SPM system 202 is configured so that all vibration paths 260, 262, 264 must pass through the SPM base 210 to reach the SPM head 208. In this example embodiment, the SPM head 208 is isolated by all of: the bellows 244; the arm 246 and the negative k mechanism 248 together; and the arm 246 and the Z positioner 250 and associated sensor 252 together.

Figure 4:
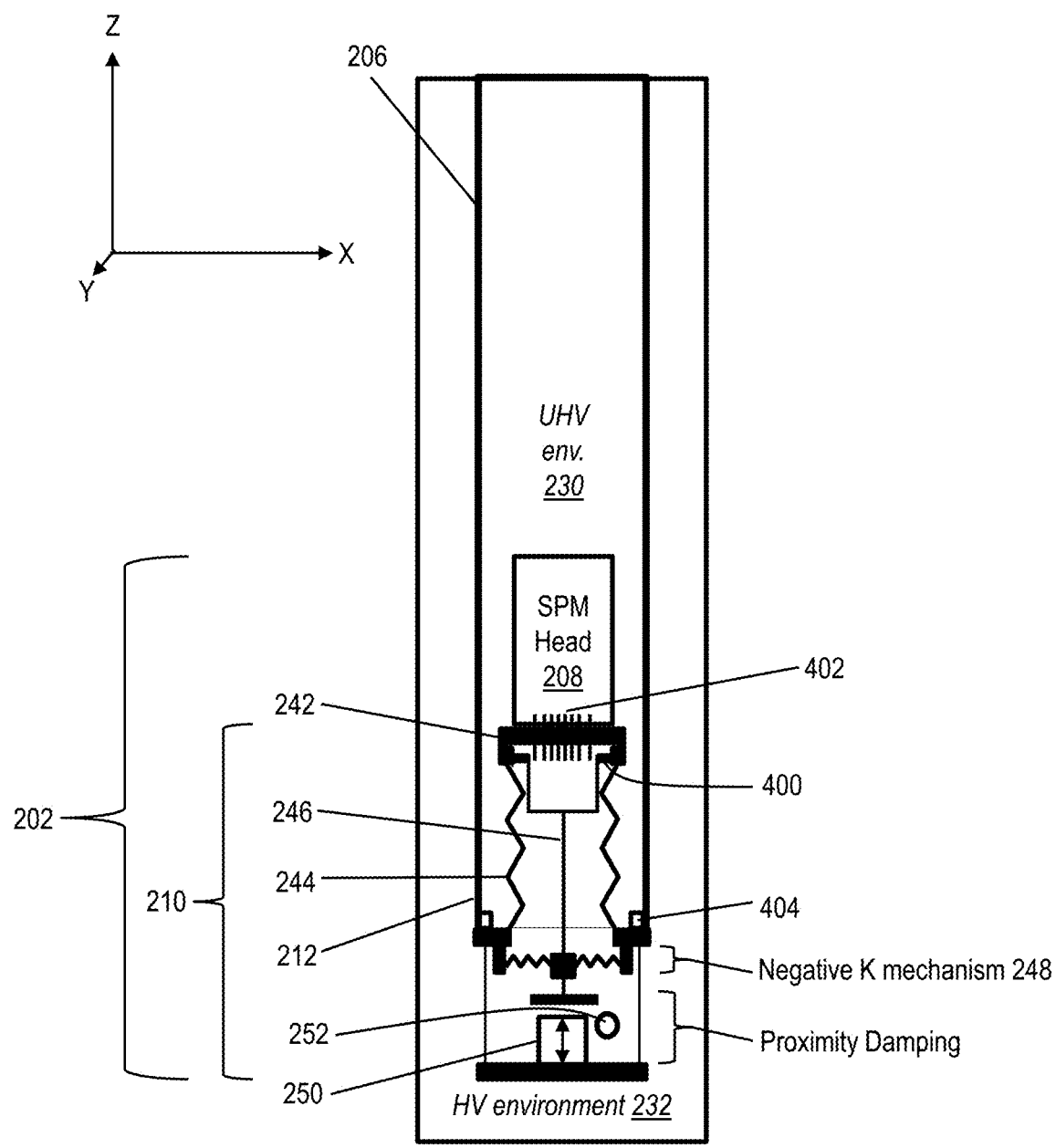
FIG. 4 shows various components of the SPM base in relation to the end of the cryostat insert.

As can be seen in FIG. 4, the top 242 is secured to the bellows 244 via a second seal 400 (e.g. an indium seal). The second seal 400 separates the UHV environment 230 from the HV environment 232 at the top of the bellows 244. The top 242 includes half 402 of a universal electrical connection between the SPM base 210 and the SPM head 208. In an example embodiment, the half 402 includes pins (e.g. 34 pins) that cooperate with receptacles on the SPM head 208 to establish electrical communication therebetween. A first seal 404 forms a seal between the lower end of the bellows 244 and the cryostat insert 206 and likewise separates the UHV environment 230 from the HV environment 232 at the lower end of the bellows 244.

The bellows 244 acts as a spring that works on vibrations in the Z direction. Further, because it is configured as an inverted pendulum (top 242 on top of the bellows 244), the bellows 244 works on vibrations in the X and Y directions (unstable orientation).

The arm 246 is secured to the top 242 to provide additional vibration control and sensing. The arm 246 interacts with the negative K mechanism 248 and optionally with the Z positioner 250 and associated sensor 252 to provide the proximity damping to further control the vibrations.

Figure 5A:
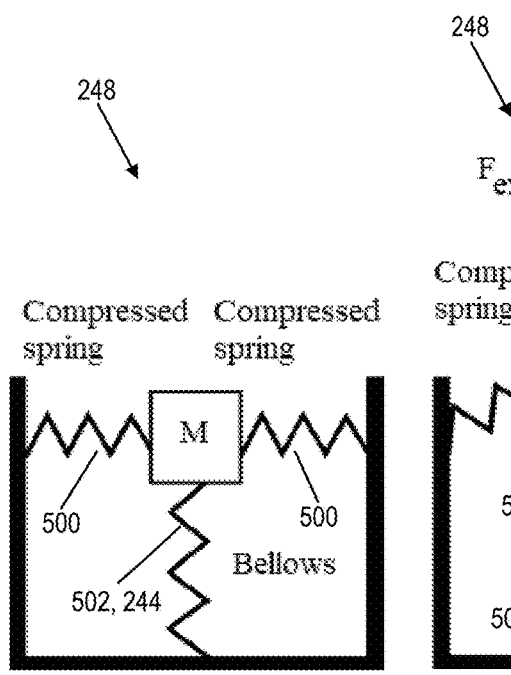
FIGS. 5A to 5B show an example embodiment of the negative K mechanism in various operational positions.
Figure 5B:
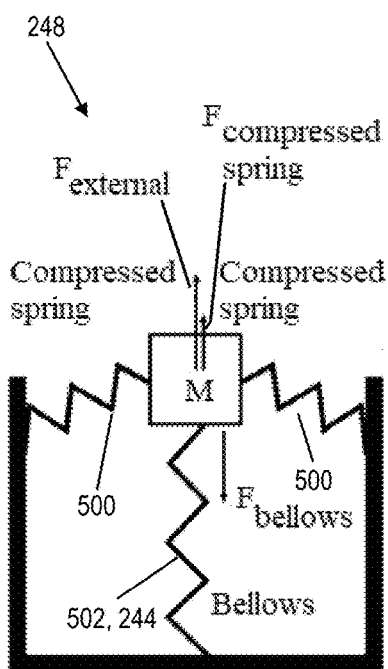

FIG. 5A to FIG. 5B show an example embodiment of the negative K mechanism 248 in various operational positions. When the negative K mechanism 248 is loaded with a suitable mass (M), XY springs 500 compress such that the XY springs 500 are horizontal and the load is taken by a Z spring 502 (bellows 244). This is termed position A. The Z spring 502 (bellows 244) provides positive stiffness and the XY springs 500 provide negative stiffness. Near position A, as shown in FIG. 5A, the stiffness is zero. As shown in FIG. 5B, as the Z spring 502 extends under the influence of an upward external force $F_{external}$, the Z spring 502 exerts a downward force $F_{bellows}$ that counters the upward external force $F_{external}$. Simultaneously, the XY springs 500 are slightly freed to expand and thereby begin to exert an upward force $F_{compressed}$ springs that counters the force of the Z spring 502 (bellows 244).

Figure 6:
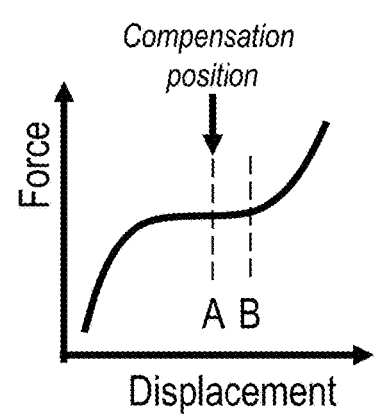
FIG. 6 shows a force versus displacement curve for the negative K mechanism of FIGS. 5A and 5B.

FIG. 6 shows a force versus displacement curve for the negative K mechanism 248 of FIG. 5A and FIG. 5B, where point A corresponds to the operational position shown in FIG. 5A and point B corresponds to the operational position shown in FIG. 5B.

Returning to FIG. 4, the Z positioner 250 and associated sensor 252 provide additional damping, including damping of resonant frequencies. In a passive method, the height of the Z positioner 250 can be set as an upper limit to the amplitude (e.g. of resonant vibrations) so that is acts as a stopper. In an active method, the height of the Z positioner 250 can be constantly adjusted to compensate for existing vibrations. This can be accomplished using piezo step motors and can achieve nanometer resolution. The associated sensor 252 can be a capacitance sensor which can be located below the arm 246.

The following figures discuss an implementation of the SPM base that applies the principles shown in the above schematic drawings.

Figure 7:
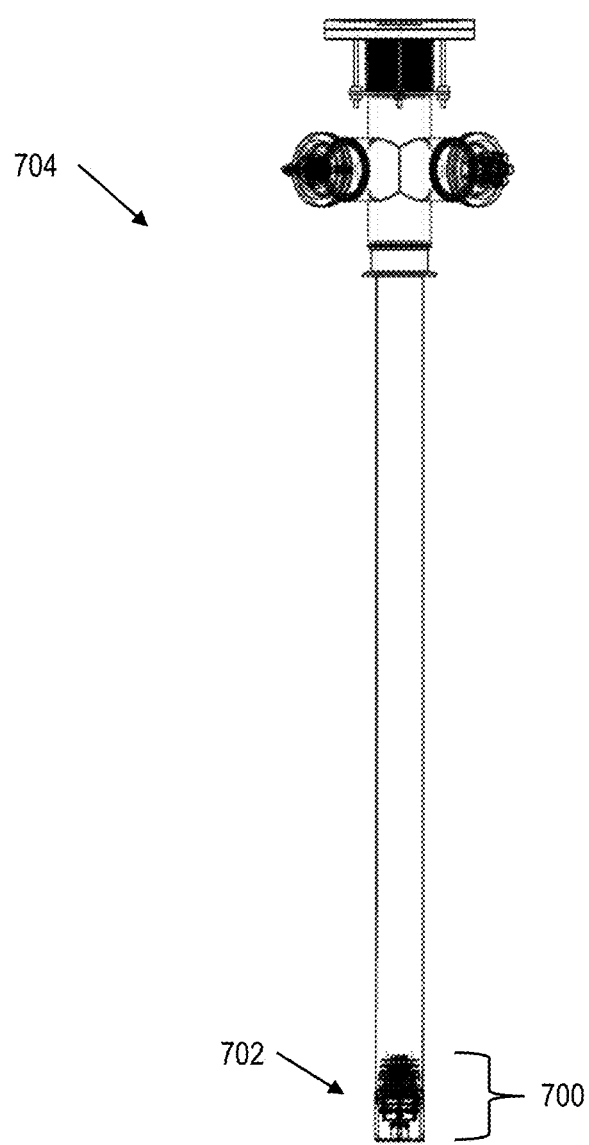
FIG. 7 shows an example embodiment of an SPM base installed at an end of an example embodiment of a cryostat insert.

FIG. 7 shows an example embodiment of an SPM base 700 installed at an end 702 of an example embodiment of a cryostat insert 704. As is discussed below, the SPM base disclosed herein incorporates unique aspects that isolate internal vibration. These are any or all of: an inverted pendulum; negative-k-stiffness; a soft electrical connection; a rigid SPM head/STM head; a passive damping Z positioner; and an active damping Z positioner.

Figure 8:
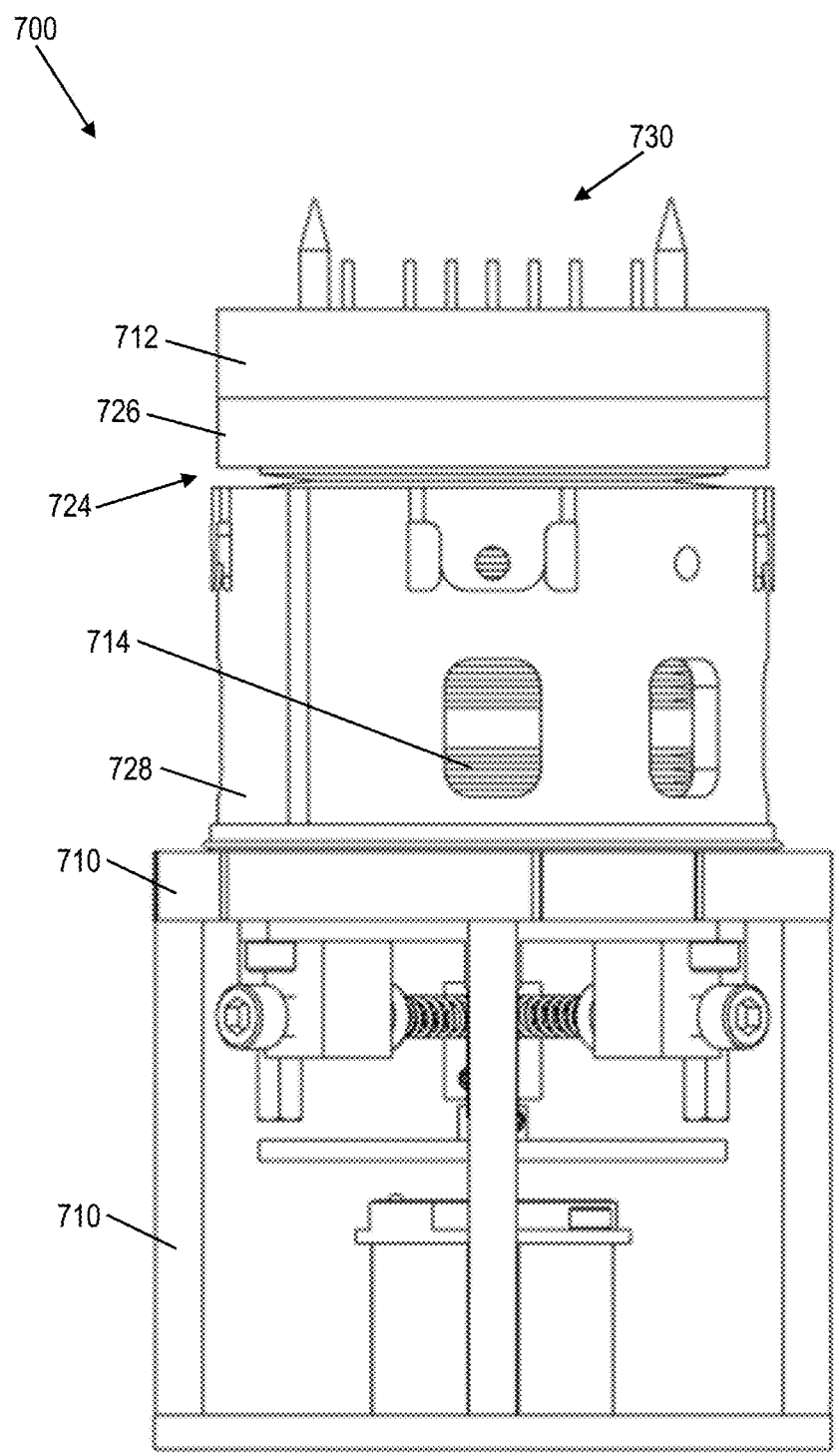
FIG. 8 shows the SPM base of FIG. 7.
Figure 9:
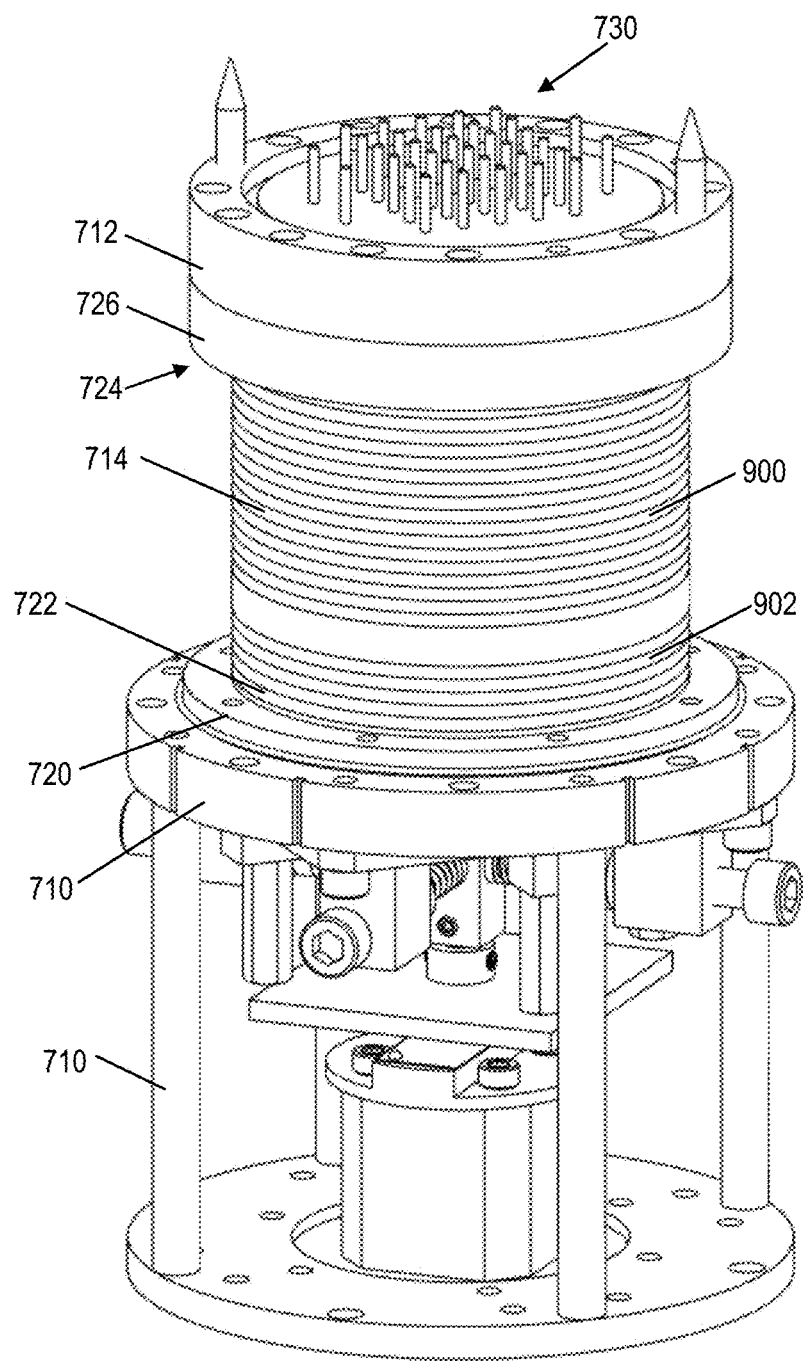
FIG. 9 shows the SPM base of FIG. 7 with the bellows stopper removed.
Figure 10:
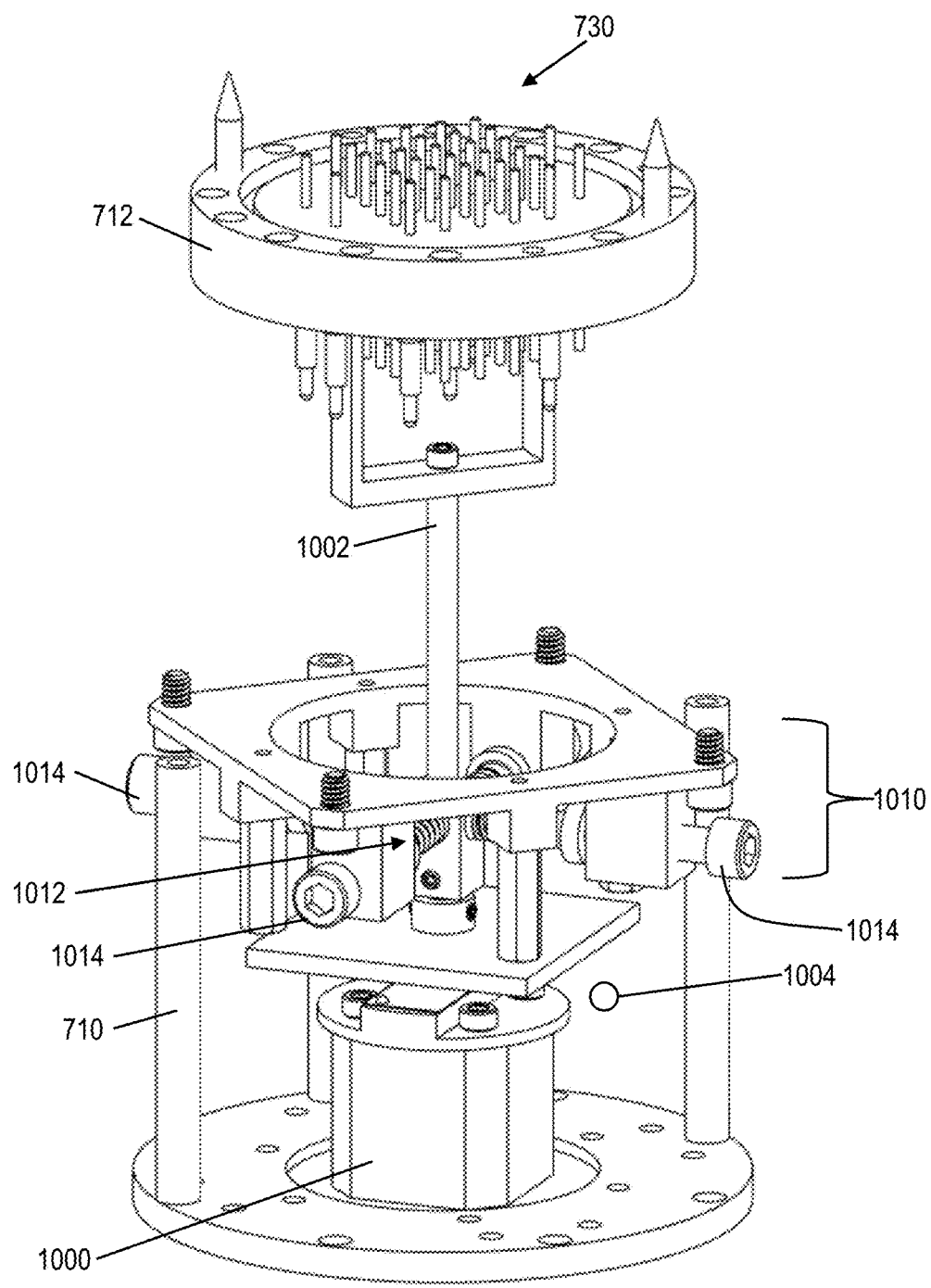
FIG. 10 shows the SPM base of FIG. 7 with the bellows stopper and the bellows removed.

FIG. 8 to FIG. 10 show the SPM base 700 of FIG. 7 in various states. FIG. 8 shows the SPM base 700 of FIG. 7 fully assembled. The SPM base 700 includes the frame 710 that is secured to the end 702 of the cryostat insert 704 and the top 712 configured to be connected to the SPM head. The SPM base 700 further includes a vibration control system between the frame 710 and the top 712. In the embodiment shown, the bellows 714 acts as a passive low-pass vibration filter system of the vibration control system and is disposed between the frame 710 and the top 712. The first HV/UHV seal 720 is disposed between the end 702 of the cryostat insert 704 and a bottom 722 of the bellows 714. Because the first HV/UHV seal 720 can be a path for vibration transmission, placing it at the bottom 722 of the bellows 714 is advantageous as it enables the bellows 714 to filter vibrations transmitted by the first HV/UHV seal 720. In this embodiment, a top 724 of the bellows 714 is also sealed by the second HV/UHV seal 726. This completes a seal between the HV environment in the cryostat and the UHV environment in the cryostat insert 704. The bellows 714 is surrounded by a bellows stopper 728 which operates as a positive stop for vertical movement of the bellows 714. At the top of the SPM base 700 is the half 730 of the universal electrical connection.

FIG. 9 shows the SPM base 700 of FIG. 7 with the bellows stopper 728 removed. In this example embodiment, the bellows 714 includes a first section 900 that oscillates at 10-20 Hz and a second section 902 that oscillates at 20-50 Hz. The bellows act as a low-band pass filter, stopping high frequency noise and only allowing low frequency noise to pass through and reach the SPM head (e.g. STM head).

FIG. 10 shows the SPM base 700 of FIG. 7 with the bellows stopper 728 and the bellows 714 removed to reveal the vibration isolation components. To prevent unwanted oscillations in the bellows 714, in this example embodiment a Z positioner 1000 is situated below the bellows 714 in the HV region and can be used to terminate the oscillations. In this example embodiment, the arm 1002 (a.k.a. damping structure) is connected to the top 724 of the bellows 714, either directly or indirectly via the top 712. The arm 1002 extends underneath the bellows 714 and can interact with the Z positioner 1000. In this example embodiment, the Z positioner 1000 can be used to passively or actively dampen the bellows 714. The passive method relies on the Z positioner 1000 to raise and touch the arm 1002, causing the bellows 714 to terminate unwanted oscillations. The active method involves raising the Z positioner 1000 to the arm 1002 and use the fine motor capabilities of the Z positioner 1000 to oscillate the arm 1002 at the same frequency as the bellows 714 but with a phase shift, ending the unwanted oscillations of the bellows 714. In an example embodiment, the Z positioner 1000 is a piezo based structure that can raise a platform that contacts the arm 1002. In an example embodiment, the Z positioner 1000 can raise the platform up to 2.5 mm. An example Z positioner is manufactured by Attocube Systems, Inc. The software control of the active method frequency matching is coded by the inventors. This example embodiment further includes a sensor 1004 that can detect vibration (e.g. a capacitance sensor) between the arm 1002 and a top of the Z positioner 1000 for monitoring the bellows 714 and Z positioner 1000.

The negative K mechanism 1010 is shown with opposed XY springs 1012 which can be adjusted via adjustment features 1014 (e.g. screws).

Figure 11:
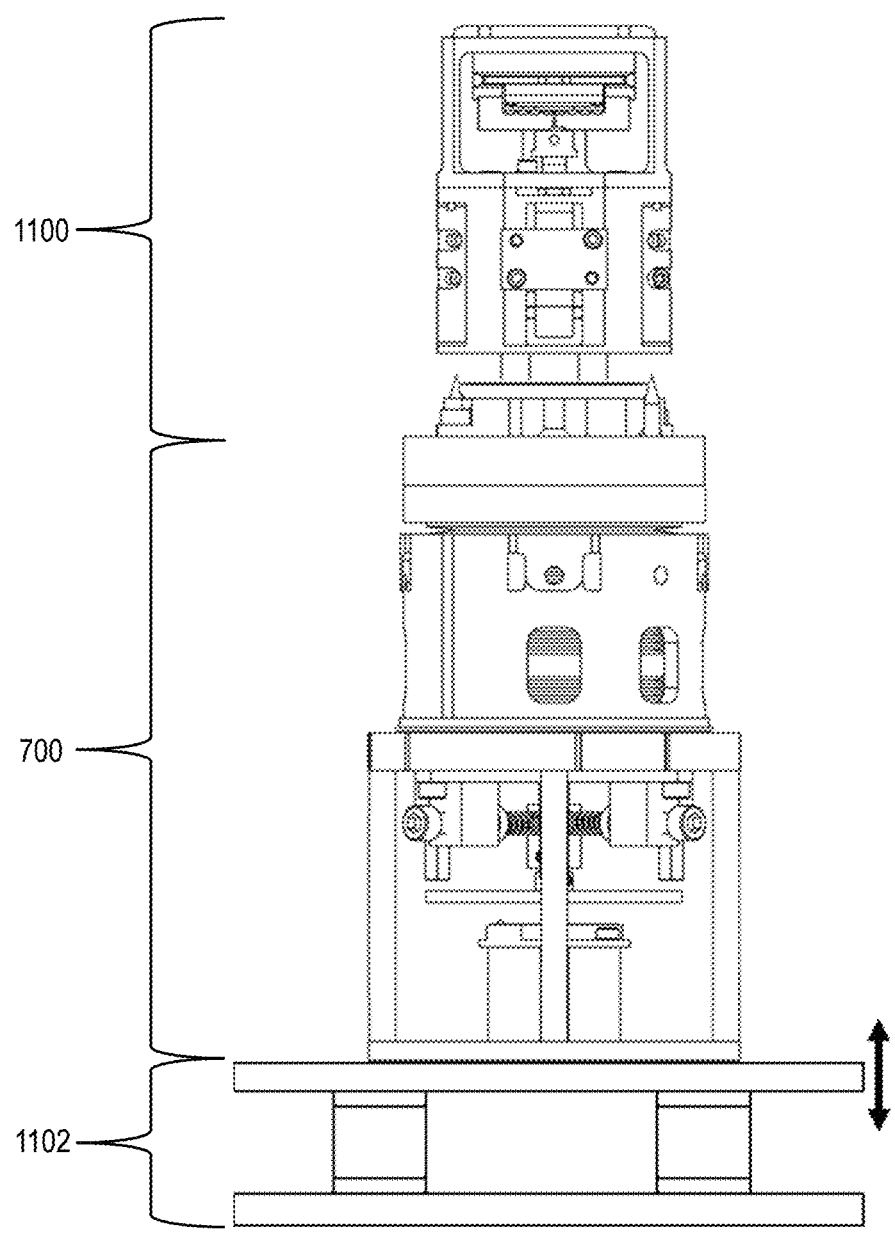
FIG. 11 shows a testing arrangement with the scanning probe microscope and associated SPM base disposed atop a local vibrator.

FIG. 11 shows a testing arrangement with an SPM head 1100 (e.g. STM head) and an associated SPM base 700 disposed atop a local vibrator 1102 which acts as a noise source. The local vibrator 1102 was used to simulate vibrations from a cryogen-free cryostat pulse tube by applying an AC voltage to the local vibrator 1102 and varying the amplitude and frequency of the noise. The STM tunneling cable was used to sense the resulting vibrations with the STM tip within tunneling range of the sample. This is a highly sensitive method to measure vibrations because the tunneling current is exponentially related to the tip and sample distance. The data was collected at room temperature in atmospheric pressure.

Figure 12A:
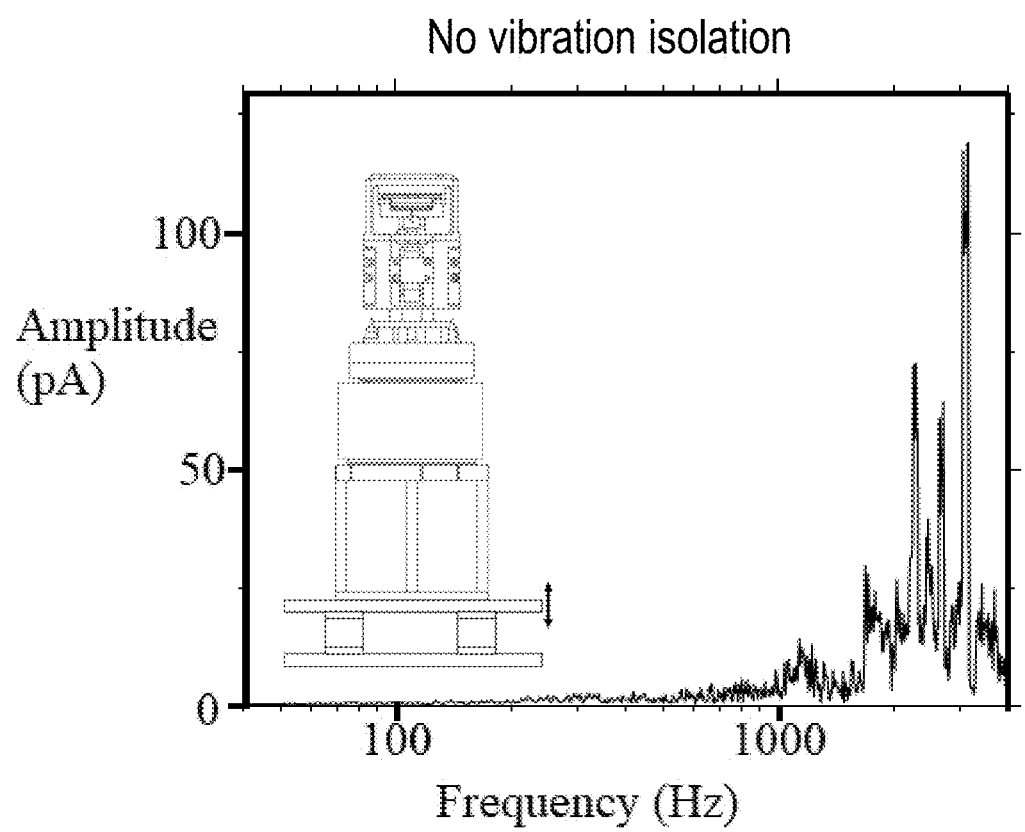
FIG. 12A is a graph showing results of vibration amplitudes at various frequencies when the SPM base is not active.
Figure 12B:
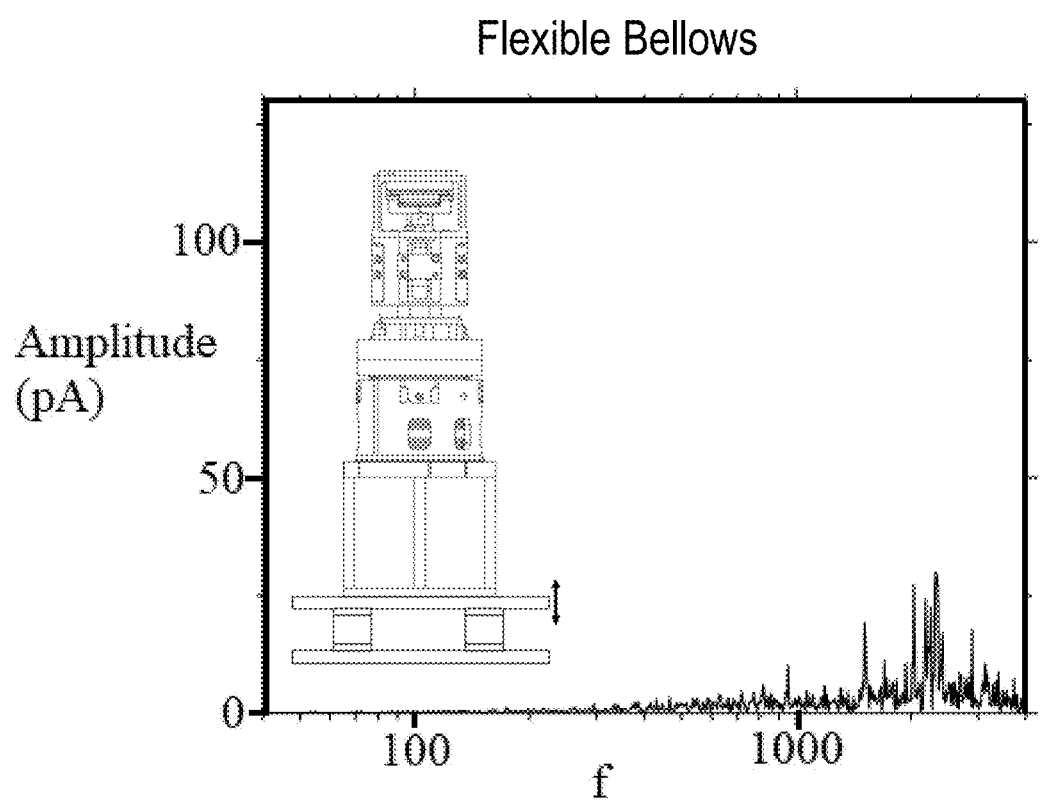
FIG. 12B is a graph showing results of vibration amplitudes at various frequencies when the bellows of the SPM base is active but the negative K mechanism of the SPM base is not active.
Figure 12C:
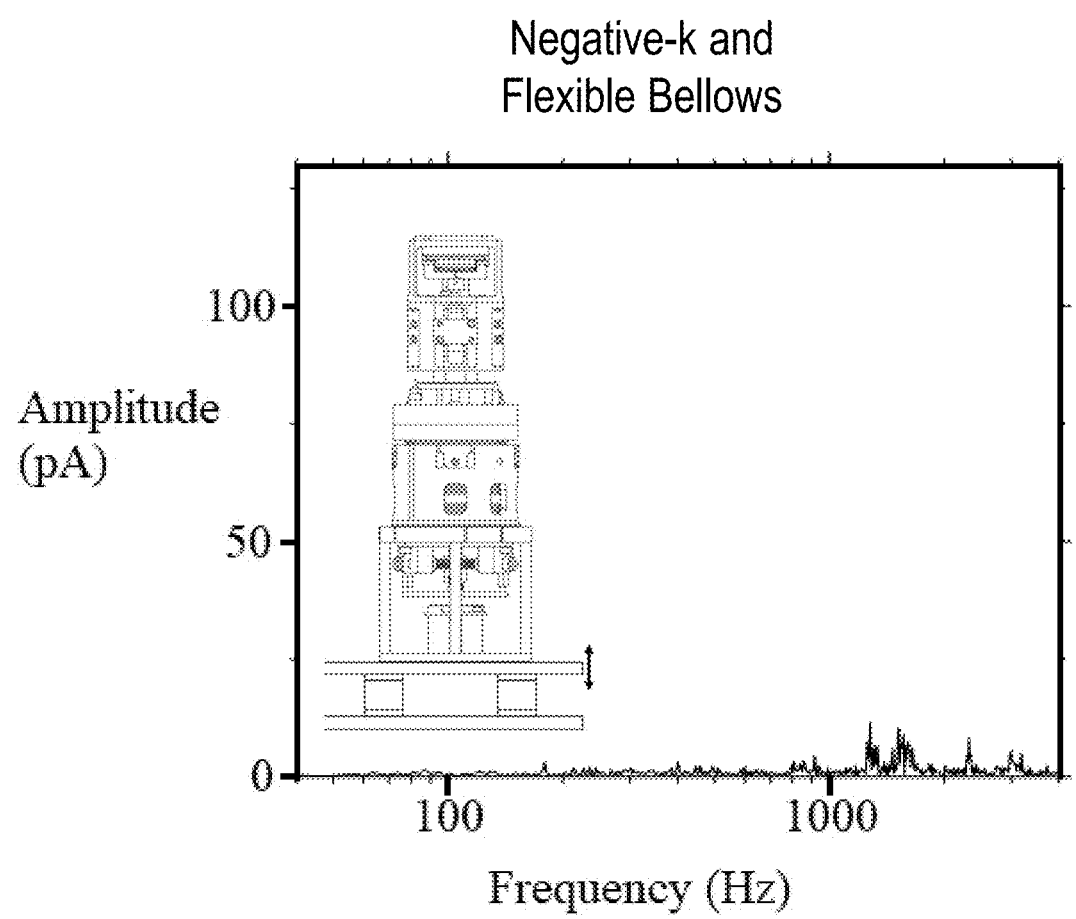
FIG. 12C is a graph showing results of vibration amplitudes at various frequencies when both the bellows and the negative K mechanism of the SPM base are active.

FIGS. 12A to 12C show the sensitivity of the SPM head/STM head 1100 to the applied vibrations via respective plots of vibration amplitudes at various frequencies. This was measured for three cases. FIG. 12A shows the first case where the SPM base 700 was not active and hence there was no vibration isolation. This is effectively the noise seen by the STM head with no vibration isolation present. The data shows that the resonant frequency of the STM head is above 1000 Hz. The maximum vibrational amplitude is 118.8 pA.

FIG. 12B shows the second case where the bellows 714 of the SPM base 700 was active but the negative K mechanism 1010 of the SPM base 700 was not active. The maximum noise seen by the STM is 30.0 pA.

FIG. 12C shows the third case where both the bellows 714 and the negative K mechanism 1010 of the SPM base 700 were active. The maximum vibration seen by the STM head was 11.6 pA.

FIG. 12A to FIG. 12C show that the inverted pendulum arrangement and negative-k stiffness of the internal vibration isolation in the SPM base 700 can significantly reduce the vibrations reaching the SPM head/STM head 1100 by a factor greater than 10. With this reduced level of noise, it is possible to operate the SPM head/STM head 1100 successfully within a cryogen-free cryostat with the pulse tube running.

FIG. 13A and FIG. 13B show STM head scans of highly oriented pyrolytic graphite (HOPG). For these scans, the SPM system 202 (with STM head) was placed on a table with no vibration isolation and the scans were performed at room temperature in atmospheric pressure. FIG. 13A shows a large area scan showing terraces of the graphite. FIG. 13B shows an atomic resolution scan under the same circumstances. As can be seen by the resolution of FIG. 13B, an improvement in resolution is desirable. An improvement in resolution can be achieved in a low temperature and (high) vacuum environment.

FIG. 14A and FIG. 14B show STM scans of highly oriented pyrolytic graphite (HOPG) made by the SPM system 202 (with STM head) while in the low temperature and (high) vacuum environment provided by the apparatus 200 disclosed above. In FIG. 14A, the SPM base 700 was not active and hence there was no vibrations isolation available for the STM head. As the FIG. 14A scans shows, vibrations caused by the pulse tube that reached the STM were too great. This prevented the observation of carbon atoms. In FIG. 14B, the SPM base 700 was active and reduced the vibrations reaching the STM head. This allowed for the observation of carbon atoms as the higher resolution in FIG. 14B shows.

As has been disclosed and shown above, the inventors have devised a unique, innovative, and effective vibration isolation system for scanning probe microscopes. The vibrations isolation system permits atomic level resolution capable of showing carbon atoms even when using the notoriously vibration-sensitive scanning tunnel microscope type of scanning probe microscope. Accordingly, this represents an improvement in the art.

3. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. An apparatus, comprising a scanning probe microscope base comprising:
  a frame configured to be secured to an end of an insert in a cryostat;
  a top configured to be connected to a base of a scanning probe microscope head that is configured to be disposed inside the insert; and
  a vibration control system disposed between the frame and the top;
  wherein the vibration control system comprises a bellows, wherein an upper end of the bellows is secured to the top and a lower end of the bellows is secured to the frame.

2. The apparatus of claim 1, the top further comprising a universal electrical connection comprising half of a plug/socket arrangement, wherein the plug/socket arrangement is configured to provide electrical communication between the top and the base of the scanning probe microscope head which has a second half of the plug/socket arrangement when the scanning probe microscope head is lowered onto the top.

3. The apparatus of claim 2, wherein the plug/socket arrangement comprises a plurality of pins disposed in a pattern on the top, each pin of the plurality of pins being configured to fit into a respective receptacle of a plurality of receptacles disposed in the pattern on the base.

4. The apparatus of claim 1, wherein the bellows is configured to seal the end of the insert, thereby separating an ultra-high vacuum environment in the insert from a high vacuum environment surrounding the end of the insert and also thereby positioning an upper surface of the top in the ultra-high vacuum environment.

5. The apparatus of claim 4, wherein the vibration control system further comprises a first seal between the lower end of the bellows and the insert, and a second seal that seals the upper end of the bellows.

6. The apparatus of claim 1, wherein the bellows comprises a first section that oscillates at a first frequency range and a second section that oscillates at a second frequency range that is different than the first frequency range.

7. The apparatus of claim 1, wherein the vibration control system further comprises a negative k mechanism secured to the upper end of the bellows and to the frame.

8. The apparatus of claim 7, wherein the vibration control system further comprises an arm comprising an upper end secured to the upper end of the bellows, and wherein the negative k mechanism comprises a first pair of opposed springs connected at respective inner ends to the arm, and a second pair of opposed springs oriented transverse to the first pair of opposed springs and connected at respective inner ends to the arm.

9. The apparatus of claim 8, wherein the vibration control system further comprises a Z positioner set apart from a lower end of the arm and configured to selectively engage the lower end of the arm, wherein in a passive mode the Z positioner is configured to raise to a position within reach of the arm and thereby limit an amplitude of vibrations in the arm.

10. The apparatus of claim 8, wherein the vibration control system further comprises a Z positioner set apart from a lower end of the arm and configured to selectively engage the lower end of the arm, wherein in an active mode the Z positioner is raised to engage with the arm and then a height of the Z positioner can be continuously adjusted to compensate for vibrations in the arm.

11. The apparatus of claim 10, wherein the vibration control system further comprises a capacitance sensor configured to detect the vibrations in the arm, and wherein the Z positioner is configured to continually adjust to compensate for the vibrations in the arm based on the vibrations detected by the capacitance sensor.

12. The apparatus of claim 1, wherein the vibration control system further comprises an arm secured to the upper end of the bellows, and a capacitance sensor configured to detect vibrations in the arm, and wherein the vibration control system is configured to control the arm to mitigate the vibrations detected by the capacitance sensor.

13. The apparatus of claim 1, wherein the vibration control system further comprises an arm comprising an upper end secured to the upper end of the bellows, and a Z positioner set apart from a lower end of the arm and configured to selectively engage the lower end of the arm, wherein in a passive mode the Z positioner is configured to raise to a position within reach of the arm and thereby limit an amplitude of vibrations in the arm.

14. The apparatus of claim 1, wherein the vibration control system further comprises an arm comprising an upper end secured to the upper end of the bellows, and a Z positioner set apart from a lower end of the arm and configured to selectively engage the lower end of the arm, wherein in an active mode the Z positioner is raised to engage with the arm and then a height of the Z positioner can be continuously adjusted to compensate for vibrations in the arm.

15. The apparatus of claim 14, wherein the vibration control system further comprises a capacitance sensor configured to detect the vibrations in the arm, and wherein the Z positioner is configured to continually adjust to compensate for the vibrations in the arm based on the vibrations detected by the capacitance sensor.

16. The apparatus of claim 1, wherein the vibration control system further comprises:
   an arm secured to the upper end of the bellows;
   a negative k mechanism comprising a first pair of opposed springs connected at respective inner ends to the arm, and a second pair of opposed springs oriented perpendicular to the first pair of opposed springs and connected at respective inner ends to the arm; and
   a capacitance sensor configured to detect vibrations in the arm;
   wherein the vibration control system is configured to continually adjust to compensate for the vibrations in the arm based on the vibrations detected by the capacitance sensor.

17. An apparatus, comprising a scanning probe microscope base comprising:
   a frame configured to be secured to an end of an insert in a cryostat;
   a top configured to be connected to a base of a scanning probe microscope head that is configured to be disposed inside the insert; and
   a damping system disposed between the frame and the top and comprising a bellows that seals the end of the insert thereby separating an ultra-high vacuum (UHV) environment in the insert from a high vacuum (HV) environment surrounding the end of the insert and also thereby positioning an upper surface of the top in the UHV environment.

18. The apparatus of claim 17, wherein the damping system further comprises a negative k mechanism disposed in the HV environment and secured to an upper end of the bellows and to the frame.

19. The apparatus of claim 18, wherein the damping system further comprises an arm secured to the upper end of the bellows, and wherein the negative k mechanism comprises a first pair of opposed springs connected at respective inner ends to the arm, and a second pair of opposed springs oriented transverse to the first pair of opposed springs and connected at respective inner ends to the arm, wherein in a middle position where the inner ends and outer ends of the first pair and the inner ends and outer ends of the second pair are all at a same height, springs of the first pair of opposed springs and springs of the second pair of opposed springs are in compression.

20. The apparatus of claim 18, wherein the damping system further comprises:
   an arm secured to the upper end of the bellows, wherein the negative k mechanism is secured to the upper end of the bellows via the arm; and
   a Z positioner disposed in the HV environment and operatively associated with the arm, wherein in a passive mode the Z positioner is configured to raise to a position in which the Z positioner can limit an amplitude of vibrations in the arm and thereby limit an amplitude of vibrations in the upper end of the bellows.

21. The apparatus of claim 18, wherein the damping system further comprises:
   an arm comprising an upper end secured to the upper end of the bellows, wherein the negative k mechanism is secured to the upper end of the bellows via the arm; and
   a Z positioner disposed in the HV environment and operatively associated with the arm, wherein in an active mode the Z positioner is raised to engage with the arm and then a height of the Z positioner can be continuously adjusted to compensate for vibrations in the arm and thereby compensate for vibrations in the upper end of the bellows.

22. The apparatus of claim 21, wherein the damping system further comprises a capacitance sensor configured to detect the vibrations in the arm, and wherein the Z positioner is configured to continually adjust to compensate for the vibrations in the arm based on the vibrations detected by the capacitance sensor and thereby compensate for the vibrations in the upper end of the bellows based on the vibrations detected by the capacitance sensor.

23. The apparatus of claim 17, wherein the damping system further comprises a capacitance sensor operatively associated with an upper end of the bellows and configured to detect vibrations in the upper end of the bellows, and wherein the damping system is configured to mitigate the vibrations in the upper end of the bellows detected by the capacitance sensor.

24. The apparatus of claim 17, the damping system further comprising a Z positioner disposed in the HV environment and operatively associated with an upper end of the bellows, wherein in a passive mode the Z positioner is configured to raise to a position in which the Z positioner can limit an amplitude of vibrations in the upper end of the bellows.

25. The apparatus of claim 17, the damping system further comprising a Z positioner disposed in the HV environment and operatively associated with an upper end of the bellows, wherein in an active mode the Z positioner is raised to a position in which the Z positioner can be continuously adjusted to compensate for vibrations in the upper end of the bellows.

26. The apparatus of claim 25, wherein the damping system further comprises a capacitance sensor configured to detect the vibrations at the upper end of the bellows, and wherein the Z positioner is configured to continually adjust to compensate for the vibrations at the upper end of the bellows based on the vibrations detected by the capacitance sensor.

27. The apparatus of claim 18, wherein the damping system further comprises:
   an arm secured to the upper end of the bellows, wherein the negative k mechanism is secured to the upper end of the bellows via the arm; and
   a capacitance sensor configured to detect vibrations in the arm;
   wherein the damping system is configured to continually adjust to compensate for the vibrations in the arm based on the vibrations detected by the capacitance sensor and thereby compensate for vibrations in the upper end of the bellows.

* * * * *